Patented Aug. 23, 1949

2,480,077

UNITED STATES PATENT OFFICE 2,480,077

COMPLEX NITRILES

Frank J. Glavis, Elkins Park, Pa., assignor to Röhm & Haas Company, Philadelphia, Pa., a corporation of Delaware No Drawing. Application April 28, 1948, Serial No. 23,851

10 Claims. (Cl. 260—465)

This invention deals with new condensates from oleonitrile and esters formed from methylolphenols and lower carboxylic acids. It also concerns a method of preparing these condensates.

In U. S. Patent No. 2,265,141, issued on December 9, 1941, it is shown that acyloxymethylphenyl esters are prepared by heating aminomethylphenols with anhydrides of carboxylic acids. The amine group of aminomethylphenols is displaced and there result esters of the formula $$\begin{array}{c}(OAc_1)_n\\|\\Ar\\|\\(CH_2OAc_2)_x\end{array}$$

wherein Ar represents an aromatic hydrocarbon nucleus, $Ac_1$ and $Ac_2$ are the acyl radicals of monocarboxylic acids, $n$ is an integer from 1 to 2 inclusive, and $x$ is an integer from 1 to 4 inclusive. Ar may represent a single aromatic nucleus of the benzene series or several phenyl groups. The phenyl groups may contain hydrocarbon substituents such as alkyl, aralkyl, or cycloalkyl groups. Typical esters are 2-acetoxymethylphenyl acetate

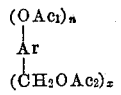

2,4-bis(acetoxymethyl)phenyl acetate

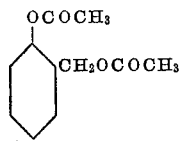

2,4,6-tris(acetoxymethyl)phenyl acetate

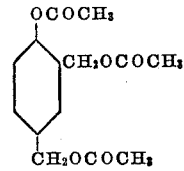

2-acetoxymethyl-4-butylphenyl acetate

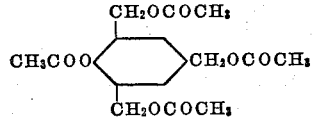

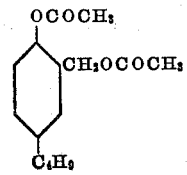

2,4-bis(acetoxymethyl)-6-cyclohexyl phenyl acetate

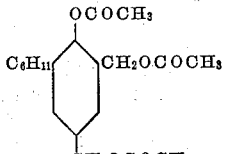

2,6-bis(acetoxymethyl)-4-benzylphenyl acetate

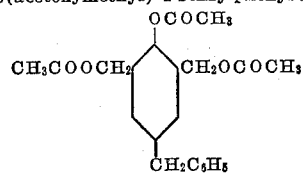

2-(or 4-)acetoxymethyl-6-phenylphenyl acetate

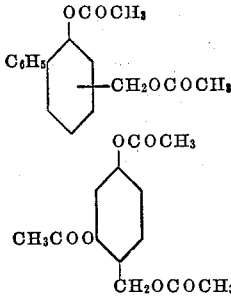

and polynuclear structures such as

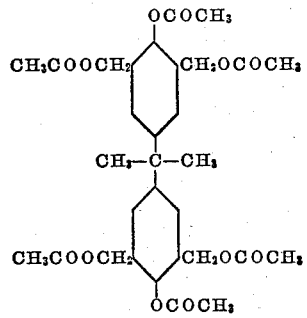

and

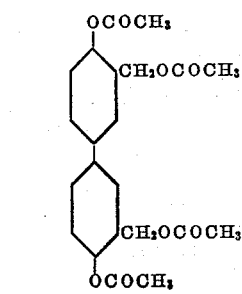

In the above illustrations the groups represented generically by Ac₁ and Ac₂ in the general formula are both shown as acetyl. The esters are not, however, to be limited to acetates; nor need the two sorts of acyl groups, Ac₁ and Ac₂, be identical. While it is best to have these groups acyl groups from lower monocarboxylic acids, particularly saturated aliphatic acids, of two to eight carbon atoms, the group Ac₁, which forms an ester with the phenolic hydroxyl group, may be different from Ac₂ and be even larger than one of eight carbon atoms. As is known, small acyl groups may be replaced with larger acyl groups by transesterification, but this is not the process or reaction here involved.

It has now been found that unsaturated aliphatic nitriles react with acyloxymethylphenyl esters to displace the acyloxy group. The reaction takes place at relatively high temperatures, 270° C. to 360° C. being a suitable range of temperature. The unsaturated nitrile becomes attached to the methylene radical from the acyloxymethyl group and the acyloxy portion appears in a monocarboxylic acid, which is distilled from the reaction mixture. For this reason the size of the acyl portion of the acyloxymethyl substituent is practically limited to eight carbon atoms. Since the acyl group Ac₁ is not thus replaced, such limitation of size of this latter group is not essential.

An available unsaturated aliphatic nitrile which is particularly useful is oleonitrile, which is readily prepared from oleic acid by reaction with ammonia.

The products obtained by the reaction of oleonitrile and the acyloxymethyl-substituted phenyl esters are exceptionally high-boiling compounds which have thermal stability at elevated temperatures. The compounds in which the phenolic hydroxyl group is esterified with acetic or propionic acids remain liquid in the cold. They are thus useful as hydraulic fluids, lubricants, and solvents. The compounds of this invention are generally useful as softeners, plasticizers, and modifiers of resinous materials.

The following examples supply details of typical preparation of the compounds of this invention.

Example 1

To a reaction vessel, fitted with a thermometer and gas inlet tube in a long neck thereof and with a condenser from a side arm, there was charged 70 parts by weight of 2,4,6-tris(acetoxymethyl)phenyl acetate and 158 parts of distilled oleonitrile. A slow stream of carbon dioxide was passed through the reaction mixture. This mixture was heated slowly to about 275° C., when reaction began. The temperature of the vapor leaving the reaction vessel was 100° to 120° C. A distillate was collected which was found to be 95% acetic acid. This reaction mixture was heated up to 285° C. and heating was continued until no more vapors were taken off. At this point 0.59 mole of acetic acid had been collected, compared with 0.60 mole of acetic acid theoretically available from the three acetoxymethyl groups. The reaction mixture was then stripped at 200° C. with the pressure being reduced to one millimeter. About five parts of distillate were obtained during this time with 178 parts of liquid remaining in the reaction vessel.

This liquid was examined for chemical and physical properties. It had a nitrogen content of 4.29% compared to the theoretical content for the tricyano compound of 4.34%. Unsaturation by bromine-absorption was 96.6% of theory for a tri-oleyl compound. The fluid had viscosities at 210° F., 100° F., and 0° F. of 21.33 cs., 179.3 cs., and 10,320 cs., respectively. This liquid has a viscosity index of 133. The viscosity at 0° F. is only 3% more than the value obtained by extrapolation of the viscosity-temperature curve from 210° F. to 100° F. It may be noted that the starting materials have the following viscosities: oleonitrile, 2.23 cs. at 210° F. and 7.18 cs. at 100° F. with a viscosity index of 82; tris(acetoxymethyl)phenyl acetate, 7.55 cs. at 210° F. and 123.1 cs. at 100° F. with a viscosity index of −64.

The compound prepared above was mixed with polyvinyl chloride and found to have a plasticizing action. The 100% modulus of a mixture of 35% of the condensate and 65% of polyvinyl chloride was found to be 1440 p. s. i.; the Kemp bend-brittle point was −8° C.

Example 2

The procedure of Example 1 was followed with a mixture of one-half mole of 2-acetoxymethyl-phenyl acetate and one-half mole of oleonitrile. The reaction temperature was carried to 360° C. The liquid obtained was non-volatile at 200° C. under one millimeter pressure. It had a viscosity of 6.89 cs. at 210° F. and 56 cs. at 100° F.

In place of the acetate groups in the above acyloxymethylphenyl esters, there may be used propionates, butyrates, or octoates. The acyl group of the acyloxymethyl substituent need not be the same as that which forms an ester grouping with the phenolic hydroxyl group, as shown in U. S. Patent No. 2,306,932, issued December 29, 1942. Thus, the phenolic hydroxyl group of an aminomethylphenol may be esterified with an acyl halide, the acyl group of which differs from that of an acid anhydride used to displace amine groups in the aminomethylphenol or its ester. In this way there are formed such compounds as

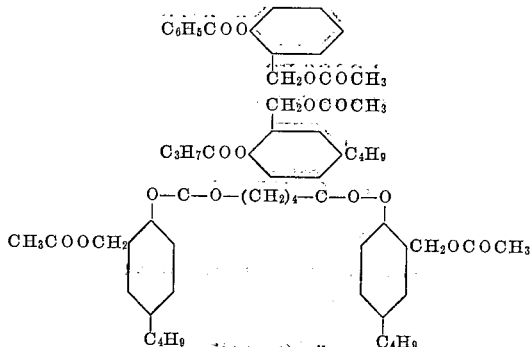

Example 3

A mixture of 67.5 grams of 2,4,6-tris(dimethylaminomethyl)phenol and 247 grams of 2-ethylhexoic anhydride was heated for ten hours at 140° C. The 2-ethylhexoic anhydride was prepared from 2-ethylhexoic acid and acetic anhydride and was distilled at 155°–160° C./30 mm. After the above reaction mixture had been heated for the ten-hour period, a forerun was removed up to 200° C./1 mm., leaving a dark, gel-like residue. To this residue was added 40 grams (0.15 mole) of oleonitrile. The mixture was then placed in a Claisen flask fitted with a gas-inlet tube and a thermometer in the long neck, a thermometer in the short neck, and at the side-arm a condenser set for downward distillation. Nitrogen was then passed through the reaction mixture and the batch heated to 270°–280° C., at which point it was held for three hours while four grams of distillate were collected up to a distillation temperature of about 120° C./atm. The nitrogen was then shut off and the system placed under reduced pressure while 35 grams of distillate were collected at 140°–145° C./30 mm. This distillate contained 23.2 grams (theoretical value is 22 grams) of 2-ethylhexoic acid by titration. Redistillation of this acid showed the boiling point to be 225°–230° C./atm., with the boiling point of 2-ethylhexoic acid reported as 226.9° C. The oleonitrile reaction product was a black solid residue. It corresponded in composition to the compound

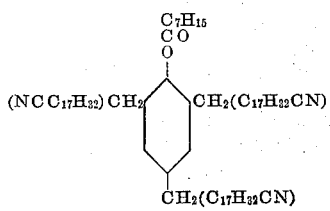

Example 4

There was prepared 2,4,6-tris(dimethylaminomethyl)phenyl 2-ethylhexoate by mixing the following materials in a distillation flask swept out with a stream of air:

| | Grams |
|---|---|
| 2,4,6-tris-(dimethylaminomethyl) phenol | 66 |
| 2-ethylhexoyl chloride | 41 |

As the chloride was added to the phenol, a solid formed (probably the amine hydrochloride). Nevertheless, the batch was held at 80°–90° C. for one-half hour. No hydrogen chloride was evolved. After the heating period 120 grams of acetic anhydride was added and the batch was refluxed for three hours. The solution became homogeneous and clear during this reflux period. At the end of the reflux period, the low-boiling materials were stripped off on a water pump, after which the system was evacuated by an oil pump and the distillation carried out. A main fraction of 69 grams (64% of the theoretical) was collected at 230°–240° C./1 mm. This material has poor viscosity-temperature properties, having a 210° F. viscosity of 6.761 cs., a 100° F. viscosity of 104.9 cs., and a viscosity index of −92. This product was identified as 2,4,6-tris(acetyloxymethyl) phenyl 2-ethylhexoate. Sixty-one grams of this triacetate was mixed with 31 grams (0.12 mole) of oleonitrile in the same apparatus described in the first example. Nitrogen gas was passed through the system. With the reaction mixture heated at 300°–315° C., 14.4 grams of distillate was collected at a distillation temperature of 108°–130° C. This distillate contained 0.11 mole of acetic acid. The residue set to a solid on cooling. It corresponded in composition to 2,4,6-tris(cyanooctadecenyl)phenyl 2-ethylhexoate.

The reaction which takes place corresponds to the following:

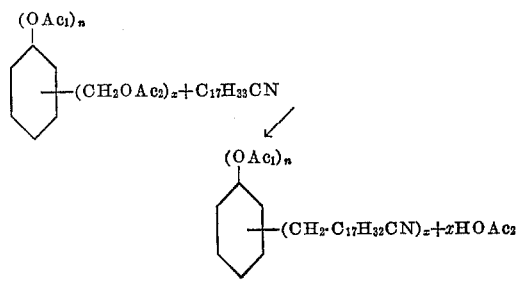

wherein $Ac_1$ represents an acyl group, preferably of not over eight carbon atoms, and $Ac_2$ represents an aliphatic acyl group of two to eight carbon atoms. The —$CH_2 \cdot C_{17}H_{32}CN$ group has a cyano group in a terminal position.

When a derivative of phenol is at hand, the starting material has the formula

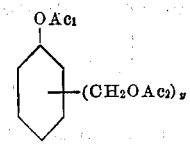

where $y$ is an integer from one to three inclusive. The derivatives of phenol are of particular interest.

I claim:

1. A process for preparing cyanooctadecenylphenyl esters of monocarboxylic acids of two to eight carbon atoms, which comprises heating together at 270° to 360° C. oleonitrile and a compound of the formula

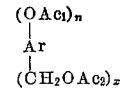

wherein Ar is an aromatic hydrocarbon nucleus, $Ac_1$ and $Ac_2$ are acyl radicals of monocarboxylic acids of two to eight carbon atoms, $n$ is an integer from one to two inclusive, and $x$ is an integer from one to four inclusive, the $CH_2OAc_2$ group occurring only in positions which are ortho and para to the $OAc_1$ group.

2. A process for preparing cyanooctadecenylphenyl esters of saturated aliphatic monocarboxylic acids of two to eight carbon atoms, which comprises heating together at 270° to 360° C. oleonitrile and a compound of the formula

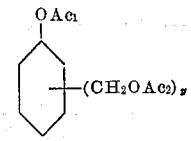

wherein $Ac_1$ and $Ac_2$ are acyl radicals of saturated aliphatic monocarboxylic acids and $y$ is an integer from one to three inclusive, the oleonitrile being reacted in an amount substantially equivalent to the —$CH_2OAc_2$ portion of the said compound, the $CH_2OAc_2$ group occurring only in positions which are ortho and para to the $OAc_1$ group.

3. A process for preparing cyanooctadecenylphenyl esters of saturated aliphatic monocarboxylic acids of two to eight carbon atoms, which comprises heating together at 270° to 360° C. a compound of the formula

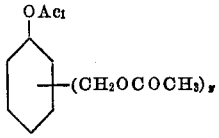

wherein $Ac_1$ represents the acyl radical of a saturated aliphatic monocarboxylic acid of two to eight carbon atoms and $y$ represents an integer from one to three inclusive, and oleonitrile in an amount substantially equivalent to the

—$CH_2OCOCH_3$ portion of said compound, the $CH_2OCOCH_3$ group occurring only in positions which are ortho and para to the $OAc_1$ group.

4. A process for preparing tris(cyanooctadecenyl)phenyl acetate, which comprises heating together at 270° to 360° C. one molecular proportion of a compound of the formula

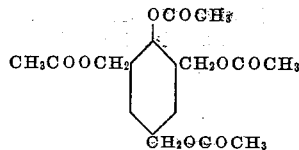

and three molecular proportions of oleonitrile.

5. A process for preparing 2-cyanooctadecenylphenyl acetate, which comprises heating together at 270° to 360° C. equimolecular proportions of 2-acetoxymethylphenyl acetate and oleonitrile.

6. As a new chemical compound, 2-(cyanooctadecenyl)phenyl acetate, having the formula

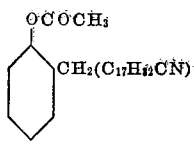

said acetate being the product obtained by reacting by heating together at 270° to 360° C. 2-acetoxymethylphenyl acetate and oleonitrile.

7. As a new chemical compound, 2,4,6-tris-(cyanooctadecenyl)phenyl acetate, said compound being the product obtained by reacting by heating together at 270° to 360° C. 2,4,6-tris-(acetoxymethyl)phenyl acetate and oleonitrile.

8. As new chemical compounds, cyanooctadecenylphenyl esters of the formula

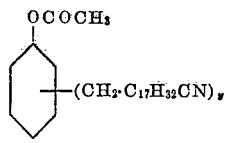

wherein $y$ is an integer from one to three inclusive, the $CH_2 \cdot C_{17}H_{32}CN$ group occurring only in positions which are ortho and para to the $OCOCH_3$ group, said compounds being those obtained by reacting together by heating at 270° to 360° C. an acyloxymethylphenyl ester of a monocarboxylic acid of two to eight carbon atoms and oleonitrile.

9. As new chemical compounds, cyanooctadecenylphenyl esters of the formula

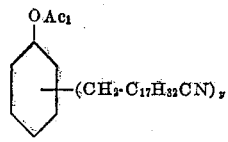

wherein $y$ is an integer from one to three inclusive and $Ac_1$ is an acyl group of a saturated aliphatic monocarboxylic acid of two to eight carbon atoms, the $CH_2 \cdot C_{17}H_{32}CN$ group occurring only in positions which are ortho and para to the $OAc_1$ group, said compounds being those obtained by reacting together by heating at 270° to 360° C. an acyloxymethylphenyl ester of a monocarboxylic acid of two to eight carbon atoms and oleonitrile.

10. As new chemical compounds, cyanooctadecenylphenyl esters of the formula

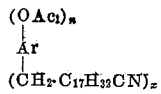

wherein $Ac_1$ is an acyl group of a saturated aliphatic monocarboxylic acid of two to eight carbon atoms, $n$ is an integer from one to two inclusive, $x$ is an integer from one to four inclusive, and Ar is an aromatic hydrocarbon nucleus, the $CH_2 \cdot C_{17}H_{32}CN$ group occurring only in positions which are ortho and para to the $OAc_1$ group, said compounds being those obtained by reacting together by heating at 270° to 360° C. an acyloxymethylphenyl ester of a monocarboxylic acid of two to eight carbon atoms and oleonitrile.

FRANK J. GLAVIS.

REFERENCES CITED

The following references are of record in the file of this patent:

UNITED STATES PATENTS

| Number | Name | Date |
| --- | --- | --- |
| 2,265,141 | Bruson | Dec. 9, 1941 |

OTHER REFERENCES

Vorlander, Beilstein (Handbuch, 4th ed.) vol. 10, page 298 (1927).